United States Patent [19]

Yamakawa et al.

[11] Patent Number: 4,896,309
[45] Date of Patent: Jan. 23, 1990

[54] OPTICAL DISC PLAYER WITH PHASE SHIFT DEPENDENT ON DISK ROTATION DIRECTION

[75] Inventors: Akio Yamakawa, Kanagawa; Noriyuki Yamashita, Tokyo; Masaaki Arai, Kanagawa, all of Japan

[73] Assignee: Sony Corporation, Tokyo, Japan

[21] Appl. No.: 201,197

[22] Filed: Jun. 2, 1988

[30] Foreign Application Priority Data

Jun. 11, 1987 [JP] Japan ................................. 62-146066

[51] Int. Cl.$^4$ .............................................. G11B 7/00
[52] U.S. Cl. ...................................... 369/44; 369/46; 369/48; 369/195; 369/199; 369/60
[58] Field of Search .................... 250/201; 369/43–47, 369/48, 53–58, 195, 199, 60; 358/342

[56] References Cited

U.S. PATENT DOCUMENTS

4,455,632  6/1984  Braat ..................................... 369/45
4,787,074  11/1988  Deck et al. ................... 369/195 XR Primary Examiner—Robert L. Richardson
Attorney, Agent, or Firm—Lewis H. Eslinger; Jay H. Maioli

[57] ABSTRACT

A signal reproducing system for use in an optical disc player comprises a photodetector including at least first and second photodetecting elements which are so disposed that a beam spot is formed on the first and second photodetecting elements by a light beam caused to impinge upon and reflected at an optical record disc and are aligned along a direction of movement of a diffraction pattern appearing in the beam spot in accordance with a record track on the optical record disc, a phase shifter for varying at least a phase of one of first and second output signals obtained respectively based on detection outputs of the first and second photodetecting elements, a switch for causing the first and second output signals selectively to pass through the phase shifter in response to a direction of movement of the record track in relation to the light beam incident upon the optical record disc, and a mixer operative to add one of the first and second output signals derived from the phase shifter to the other of the first and second output signals so as to produce a reproduced information signal.

12 Claims, 4 Drawing Sheets

OPTICAL DISC PLAYER WITH PHASE SHIFT DEPENDENT ON DISK ROTATION DIRECTION

BACKGROUND OF THE INVENTION

1. Field of the Invention

The present invention relates generally to signal reproducing systems for use in optical disc players, and more particularly, to a system for reproducing an information signal in an optical disc player which is operative to rotate an optical record disc on which the information signal is recorded and cause a light beam to impinge upon the optical record disc rotating at a predetermined speed so as to read the information signal from the optical record disc.

2. Description of the Prior Art

In an optical disc player for reproducing an information signal recorded on an optical record disc, an optical head device is provided for constituting an optical arrangement to read the information signal from a spiral track or concentrically circular record tracks formed on the optical record disc. An example of such an optical head device is arranged as shown schematically in FIG. 1.

Figure 1:
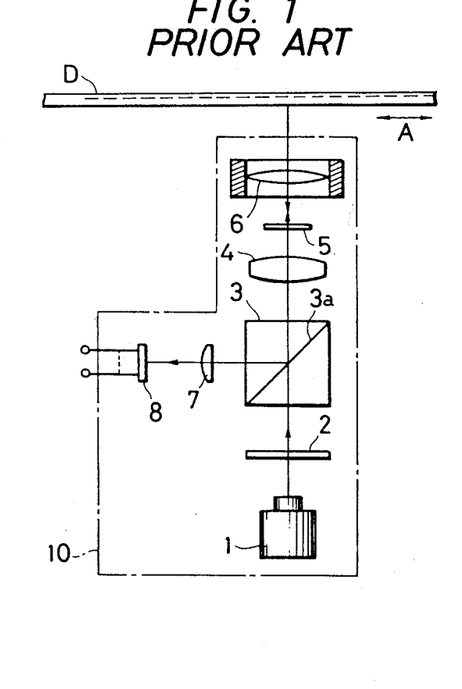
FIG. 1 is a schematic illustration showing an optical unit employed in an optical disc player.

The optical head device shown in FIG. 1 is formed into an optical unit 10 which contains a semiconductor laser element 1, an objective lens 6, a photodetector 8 and other optical parts and is movable in a direction of the radius of an optical record disc D on which, for example, a spiral record track is formed, as indicated by an arrow A. In the optical unit 10, a laser light beam generated by the semiconductor laser element 1 is diffracted by a diffraction grating 2 to be divided into three beams, which are represented with a single solid line in FIG. 1 for the sake of simplification, and each of the three laser light beams is directed to a polarizing beam splitter 3 to pass through a plane of analyzer 3a therein and then enters into a collimator lens 4. The laser light beam collimated by the collimator lens 4 passes through a quarter-wave plate 5 and enters into the objective lens 6 to be focused thereby to impinge upon the optical record disc D. On that occasion, three laser light beams are so aligned as to form a center beam used for reading an information signal from the spiral record track and detecting a focusing condition of each beam on the optical record disc D and two side beams positioned at both sides of the center beam to be used for detecting a tracking condition of the center beam in relation to the spiral record track on the optical record disc D. At the spiral record track on the optical record disc D, the three laser light beams are modulated in intensity and then reflected to form three reflected laser light beams.

The three reflected laser light beams from the optical record disc D return through the objective lens 6 to pass through the quarter-wave plate 5. Each of three reflected laser light beams having passed through the quarter-wave plate 5 has its plane of polarization rotated by ninety degrees in comparison with the respective laser light beam incident upon the optical record disc D.

The three reflected laser light beams having passed through the quarter-wave plate 5 pass through the collimator lens 4 into the polarizing beam splitter 3 and are reflected at the plane of analyzer 3a in the polarizing beam splitter 3 to be guided through a light receiving lens 7 to the photodetector 8. Then, detection output signals obtained based on a center beam and two side beams of three reflected laser light beams respectively are derived separately from the photodetector 8.

Figure 2:
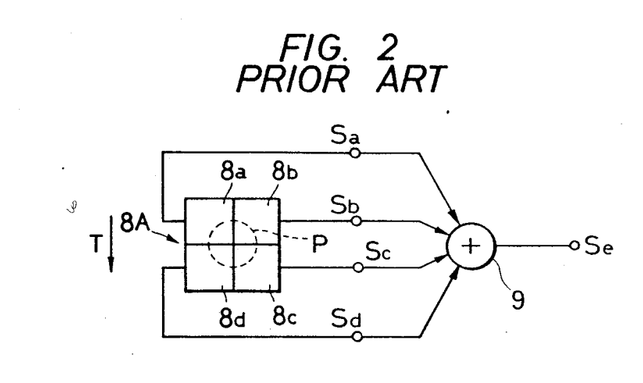
FIG. 2 is a schematic illustration showing a part of a photodetector in the optical unit shown in FIG. 1 and one example of a previously proposed signal processing circuit.

As shown in FIG. 2, a detecting portion 8A of the photodetector 8 provided for detecting the center beam is composed of four photodetecting elements 8a, 8b, 8c and 8d and a reproduced information signal and a focus error signal are obtained based on respective output signals of four photodetecting elements 8a to 8d. The photodetecting elements 8a to 8d are disposed close to one another and so arranged that the photodetecting elements 8a and 8b are aligned to cross at a substantially right angle to a direction corresponding to the tangential direction of the spiral record track on a plane in which the detecting portion 8A is disposed, and the photodetecting elements 8d and 8c are also aligned to cross at a substantially right angle to the direction corresponding to the tangential direction of the spiral record track on the plane in which the detecting portion 8A is disposed. The center beam reaching the detecting portion 8A forms a beam spot P on the photodetecting elements 8a to 8d thus arranged and the photodetecting elements 8a to 8d produce respective output signals Sa, Sb, Sc and Sd each corresponding to a portion of the beam spot P formed on each of the photodetecting elements 8a to 8d.

For producing the reproduced information signal, the output signals Sa, Sb, Sc and Sd obtained from the photodetecting elements 8a to 8d are summed up at an adder 9 to produce an added signal Se as shown in FIG. 2 and the added signal Se is used as the reproduced information signal, in the same manner as disclosed in, for example, U.S. Pat. No. 4,079,247.

In such a case, the information signal is recorded usually in the form of small pits arranged in the spiral record track on the optical record track, and therefore the center beam is subjected to diffraction caused in response to each of the pits by a relative movement of the spiral record track to the center beam irradiating the spiral record track resulted from the rotation of the optical record disc. Accordingly, in the beam spot P formed on the photodetecting elements 8a to 8d by the center beam, a diffraction pattern corresponding to each pit in the spiral record track moves, for example, in a direction indicated with an arrow T in FIG. 2, that is, a direction from the photodetecting element 8a to the photodetecting element 8d or from the photodetecting element 8b to the photodetecting element 8c, at a speed corresponding to a moving speed of the spiral record track, and each of the output signals Sa to Sd varies in accordance with variations in the diffraction pattern moving in the beam spot P. As a result, phase differences arise between the output signal Sa of the photodetecting element 8a and the output signal Sd of the photodetecting element 8d and between the output signal Sb of the photodetecting element 8b and the output signal Sc of the photodetecting element 8c, respectively, in response to the movement of the diffraction pattern in the beam spot P. The amount of each phase difference is determined by various factors including the moving speed of the spiral record track relative to the center beam irradiating the spiral record track, the size of the detecting portion 8A, the size of the beam spot P formed on the detecting portion 8A and so on. Consequently, in the case where such phase differences are not negligible, there is a problem that a proper reproduced information signal cannot be obtained by merely adding up the output signals Sa to Sd of the photodetecting elements 8a to 8d, respectively.

Figure 3:
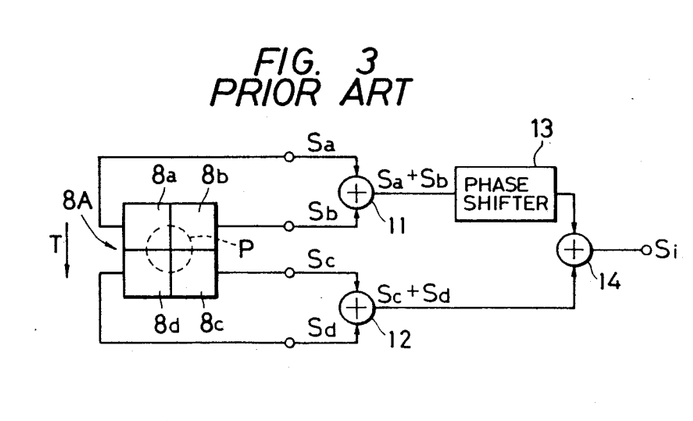
FIG. 3 is a schematic illustration showing the part of the photodetector shown in FIG. 2 and another example of the previously proposed signal processing circuit.

For the purpose of eliminating this problem, there has been proposed an improved signal processing circuit for producing a reproduced information signal based on the output signals Sa to Sd of the photodetecting elements 8a to 8d, as shown in FIG. 3.

In the signal processing circuit shown in FIG. 3, the output signals Sa and Sb derived from the photodetecting elements 8a and 8b, respectively, are added to each other in an adder 11 to produce an added signal Sa+Sb, and the added signal Sa+Sb is supplied to a phase shifter 13 which is operative to cause the added signal Sa+Sb to have a phase lag corresponding to the phase difference between the output signals Sa and Sd derived respectively from the photodetecting elements 8a and 8d, or between the output signals Sb and Sc derived respectively from the photodetecting elements 8b and 8c. Further, the output signals Sc and Sd derived respectively from the photodetecting elements 8c and 8d are added to each other in an adder 12 to produce an added signal Sc+Sd. Then, the added signal Sa+Sb subjected to the phase lag by the phase shifter 13 and the added signal Sc+Sd obtained from the adder 12 are added to each other in an adder 14 to produce a reproduced information signal Si. This circuit arrangement results in that the reproduced information signal Si is obtained by adding up the output signals Sa to Sd after each of the phase differences between the output signals Sa and Sd and between the output signals Sb and Sc is eliminated, so that waveform distortion of the reproduced information signal Si is reduced and a signal to noise ratio of the reproduced information signal Si is improved.

Figure 4:
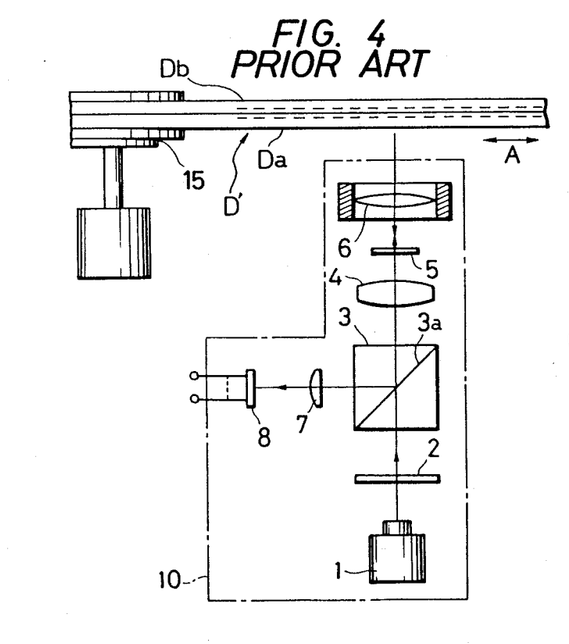
FIG. 4 is a schematic illustration showing a part of an optical disc player used for reproducing information signals from a double-faced optical record disc.
Figure 5:
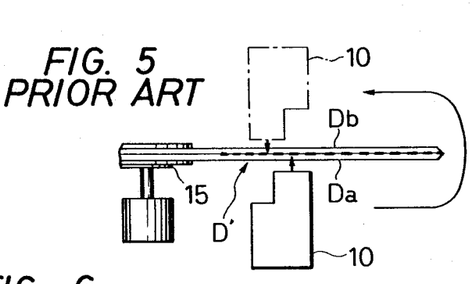
FIG. 5 is a schematic illustration used for explaining the operation of the optical disc player used for reproducing information signals from the double-faced optical record disc.

In the meantime, when an optical disc player employing the optical unit 10 shown in FIG. 1 and a signal processing circuit connected to the optical unit 10 is used for reproducing information signals from a double-faced optical record disc which has respective spiral record tracks at both sides, as shown in FIG. 4, the optical unit 10 is disposed to face a double-faced optical record disc D' loaded rotatably on a disc driving table 15 and, for example, first an information signal recorded on the side of a surface Da is reproduced and then another information signal recorded on the side of a surface Db is reproduced. On that occasion, after the reproduction of the information signal recorded on the side of the surface Da has been completed, the optical unit 10 which has faced the surface Da is moved through a path detouring around the double-faced optical record disc D' to face the surface Db for the reproduction of the information signal recorded on the side of the surface Db, as shown in FIG. 5.

In such a case, the double-faced optical record disc D' is kept continuously on the disc driving table 15 during both reproductions of the information signal recorded on the side of the surface Da and the information signal recorded on the side of the surface Db, but the direction of rotation of the double-faced optical record disc D' is changed to reverse between the reproduction of the information signal recorded on the side of the surface Da and the reproduction of the information signal recorded on the side of the surface Db. Therefore, the direction of movement of the spiral record track on the side of the surface Da in relation to the center beam from the optical unit 10 incident upon the surface Da and the direction of movement of the spiral record track on the side of the surface Db in relation to the center beam from the optical unit 10 incident upon the surface Db, are opposite to each other. This results in that each of the phase differences between the output signal Sa of the photodetecting element 8a and the output signal Sd of the photodetecting element 8d and between the output signal Sb of the photodetecting element 8b and the output signal Sc of the photodetecting element 8c, which arise in the signal processing circuit, is inverted between the reproduction of the information signal recorded on the side of the surface Da and the reproduction of the information signal recorded on the side of the surface Db, and consequently the improved signal processing circuit having the phase shifter 13 and shown in FIG. 3 is not available, so that waveform distortion of the reproduced information signal cannot be reduced and a signal to noise ratio of the reproduced information signal cannot be improved.

Such problems as mentioned above arise also on an optical disc player which employs the optical unit 10 shown in FIG. 1 and a signal processing circuit connected to the optical unit 10 and is constituted to able to reproduce selectively both information signals from optical record discs of two different types, such as a compatible optical disc player which is operative to reproduce selectively information signals from a video disc which has its diameter of approximately 30 cm and on which a television signal is recorded and a compact disc which has its diameter of approximately 12 cm and on which a digital audio signal is recorded.

Figure 6:
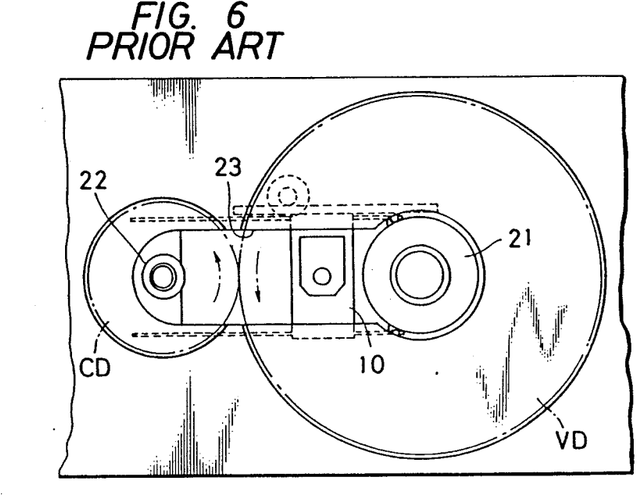
FIG. 6 is a schematic plan view showing a part of a compatible optical disc player.

As shown in FIG. 6, in the compatible optical disc player, a first disc driving table 21 on which a video disc VD is loaded and a second disc driving table 22 on which a compact disc CD is loaded are disposed separately and the optical unit 10 is provided between the first and second disc driving tables 21 and 22 to be movable linearly in a direction along an imaginary line passing through both of the centers of the first and second disc driving tables 21 and 22. The laser light beams emitted from the optical unit 10 to form including the center beam and the side beams are caused to impinge upon one of the video disc VD and the compact disc CD rotated by the first disc driving table 21 and the second disc driving table 22, respectively, so as to read the information signal recorded on the video disc VD or the compact disc CD.

When the laser light beams from the optical unit 10 trace a spiral record tracks formed on the video disc VD and the compact disc CD, the optical unit 10 moves linearly along an opening 23 provided between the first and second disc driving tables 21 and 22 in a predetermined direction from one to the other of the first and second disc driving tables 21 and 22. The optical unit 10 having such a linear movement between the first and second disc driving tables 21 and 22 moves in the radial direction from the innermost radius to the outermost radius of the video disc VD and in the radial direction from the outermost radius to the innermost radius of the compact disc CD, or in the radial direction from the innermost radius to the outermost radius of the compact disc CD and in the radial direction from the outermost radius to the innermost radius of the video disc VD. Further, the video disc VD and the compact disc CD are rotated in the same direction by the first and second disc driving tables 21 and 22, respectively.

Therefore, the direction of movement of the spiral record track on the video disc VD in relation to the center beam from the optical unit 10 incident upon the video disc VD and the direction of movement of the spiral record track on the compact disc CD in relation to the center beam from the optical unit 10 incident upon the compact disc CD, are opposite to each other. This results in that each of the phase differences between the output signal Sa of the photodetecting element 8a and the output signal Sd of the photodetecting element 8d and between the output signal Sb of the photodetecting element 8b and the output signal Sc of the photodetecting element 8c, which arise in the signal processing circuit, is inverted between the reproduction of the information signal recorded on the video disc VD and the reproduction of the information signal recorded on the compact disc CD, and consequently the improved signal processing circuit having the phase shifter 13 and shown in FIG. 3 is not available for the compatible optical disc player.

OBJECTS AND SUMMARY OF THE INVENTION

Accordingly, it is an object of the present invention to provide a signal reproducing system for use in an optical disc player operative to rotate an optical record disc on which an information signal is recorded and to cause a light beam to impinge upon the optical record disc rotating at a predetermined speed so as to read the information signal from the optical record disc, which avoids the aforementioned problems encountered with the prior art.

Another object of the present invention is to provide a signal reproducing system for use in an optical disc player operative to rotate an optical record disc on which an information signal is recorded and to cause a light beam to impinge upon the optical record disc rotating at a predetermined speed so as to read the information signal from the optical record disc, by which a reproduced information signal with reduced waveform distortion and a superior signal to noise ratio can be obtained in both a first situation wherein the optical record disc is rotated clockwise in relation to the light beam incident upon the optical record disc and a second situation wherein the optical record disc is rotated counterclockwise in relation to the light beam incident upon the optical record disc.

A further object of the present invention is to provide a signal reproducing system for use in an optical disc player operative to rotate an optical record disc on which an information signal is recorded and to cause a light beam to impinge upon the optical record disc rotating at a predetermined speed so as to read the information signal from the optical record disc, by which a reproduced information signal with reduced waveform distortion and a superior signal to noise ratio can be obtained when the optical disc player is used for reproducing information signals from a double-faced optical record disc which has respective record tracks at both sides.

A still further object of the present invention is to provide a signal reproducing system for use in an optical disc player operative to rotate an optical record disc on which an information signal is recorded and cause a light beam to impinge upon the optical record disc rotating at a predetermined speed so as to read the information signal from the optical record disc, by which a reproduced information signal with reduced waveform distortion and a superior signal to noise ratio can be obtained when the optical disc player is constituted to be a compatible optical disc player which is operative to reproduce selectively both information signals from optical record discs of two different types, such as a video disc and a compact disc.

According to the present invention, there is provided a signal reproducing system for use in an optical disc player which uses a light beam incident upon an optical record disc on which an information signal is recorded in a record track to read the information signal from the optical record disc, comprising a photodetector including at least first and second photodetecting elements which are so disposed that a beam spot is formed on the first and second photodetecting elements by the light beam caused to impinge upon and reflected at the optical record disc and are aligned along a direction of movement of a diffraction pattern appearing in the beam spot in accordance with the record track on the optical record disc, a phase shifter for varying the phase of at least one of first and second output signals obtained respectively based on detection outputs of the first and second photodetecting elements, a switch for causing the first and second output signals selectively to pass through the phase shifter in response to a direction of movement of the record track in relation to the light beam incident upon the optical record disc, and a mixer operative to add one of the first and second output signals derived from the phase shifter to the other of the first and second output signals so as to produce a reproduced information signal.

In the signal reproducing system thus constituted in accordance with the present invention, the first and second output signals obtained respectively based on the detection outputs of the first and second photodetecting elements in the photodetector are selectively applied to the phase shifter through the switch in response to the direction of movement of the record track in relation to the light beam incident upon the optical record disc, so that a phase difference between the first and second output signals is eliminated or reduced to be negligible, and one of the first and second output signals derived from the phase shifter and the other of the first and second output signals are supplied to the mixer without a substantial phase difference therebetween. Therefore, in both a first situation wherein the optical record disc is rotated clockwise in relation to the light beam incident upon the optical record disc and a second situation wherein the optical record disc is rotated counterclockwise in relation to the light beam incident upon the optical record disc, the reproduced information signal is derived as a signal with reduced waveform distortion and an improved signal to noise ratio from the mixer in which one of the first and second output signals derived from the phase shifter is added to the other of the first and second output signals.

The above and other objects, features and advantages of the present invention will become apparent from the following detailed description which is to be read in conjunction with the accompanying drawings.

DESCRIPTION OF THE PREFERRED EMBODIMENTS

Figure 7:
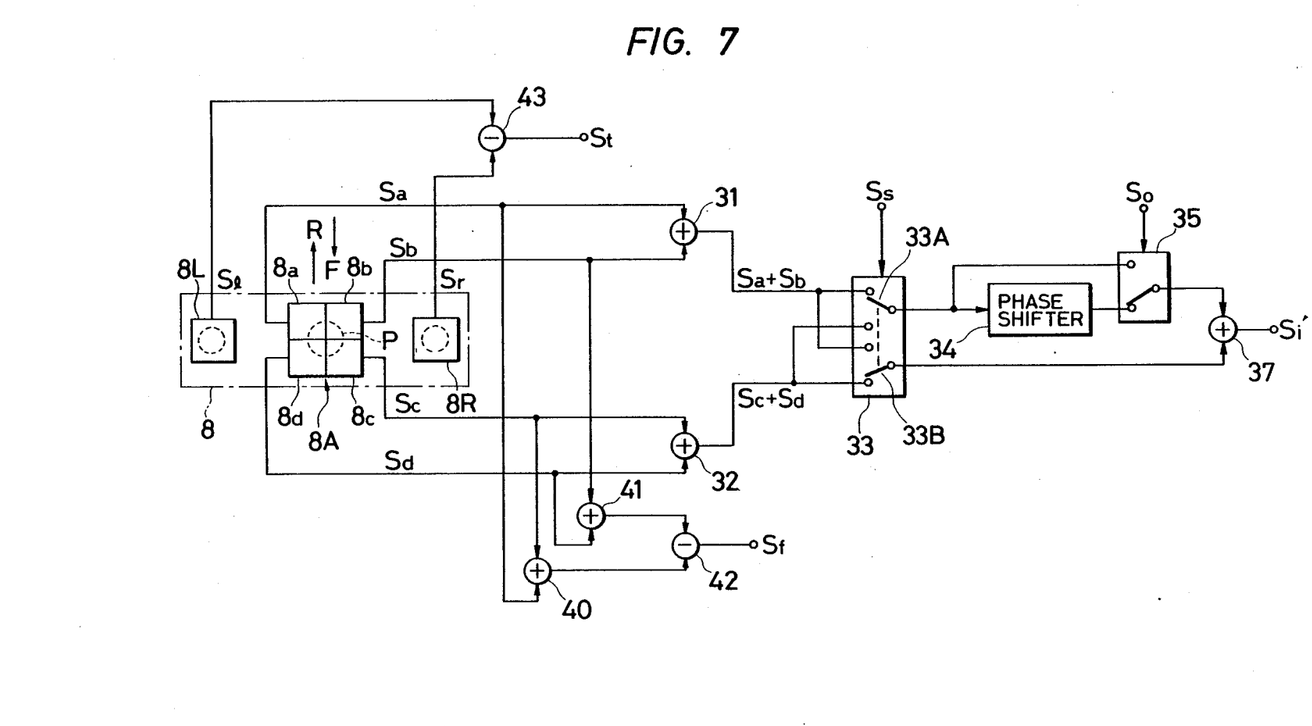
FIG. 7 is a schematic illustration showing one embodiment of signal reproducing system for use in an optical disc player according to the present invention.

FIG. 7 shows an example of a signal reproducing system for use in an optical disc player according to the present invention.

This example is applied to, for example, an optical disc player in which the optical unit 10 shown in FIG. 1 is provided and three laser light beams generated to form a center beam and two side beams by the optical unit 10 are caused to impinge upon an optical record disc which is provided with, for example, a spiral record track formed thereon with an arrangement of small pits and rotated at a predetermined speed, so as to be modulated in intensity by the small pits arranged in the spiral record track and then reflected at the optical record disc to form three reflected laser light beams including a reflected center beam and two reflected side beams.

The example shown in FIG. 7 includes a photodetector 8 which constitutes partially the optical unit 10 and comprises a detecting portion 8A for detecting the reflected center beam and a pair of detecting portions 8L and 8R disposed to face each other with the detecting portion 8A between for detecting respectively the reflected side beams. The detecting portion 8A is composed of four photodetecting elements 8a, 8b, 8c and 8d which are disposed close to one another and so arranged that the photodetecting elements 8a and 8b are aligned to cross at a substantially right angle to a direction corresponding to the tangential direction of the spiral record track on a plane in which the detecting portion 8A is disposed, and the photodetecting elements 8d and 8c are also aligned to cross at a substantially right angle to the direction corresponding to the tangential direction of the spiral record track on the plane in which the detecting portion 8A is disposed. On the photodetecting elements 8a to 8d thus arranged, the reflected center beam forms a beam spot P, and the photodetecting elements 8a to 8d produce respective output signals Sa, Sb, Sc and Sd each corresponding to a portion of the beam spot P formed on each of the photodetecting elements 8a to 8d.

The reflected center beam irradiating the photodetecting elements 8a to 8d has been subjected to diffraction caused in response to each of the pits in the spiral record track which is moved in relation to the center beam incident upon the optical record disc by the rotation of the optical record disc. Accordingly, in the beam spot P formed on the photodetecting elements 8a to 8d by the reflected center beam, a diffraction pattern corresponding to each pit in the spiral record track moves, for example, in a direction indicated with an arrow F or R in FIG. 7, that is, a direction from the photodetecting element 8a to the photodetecting element 8d or from the photodetecting element 8b to the photodetecting element 8c, or a direction from the photodetecting element 8d to the photodetecting element 8a or from the photodetecting element 8c to the photodetecting element 8b, at a speed corresponding to a moving speed of the spiral record track, and each of the output signals Sa to Sd varies in accordance with variations in the diffraction pattern moving in the beam spot P. As a result, phase differences arise between the output signal Sa of the photodetecting element 8a and the output signal Sd of the photodetecting element 8d and between the output signal Sb of the photodetecting element 8b and the output signal Sc of the photodetecting element 8c, respectively, in response to the movement of the diffraction pattern in the beam spot P.

The output signals Sa and Sb obtained from the photodetecting elements 8a and 8b, respectively, are added to each other in an adder 31 to produce an added signal Sa +Sb, and the output signals Sc and Sd obtained from the photodetecting elements 8c and 8d, respectively, are also added to each other in an adder 32 to produce an added signal Sc+Sd. Then, the added signals Sa+Sb and Sc+Sd are supplied to a switching block 33. The switching block 33 contains first and second switches 33A and 33B for extracting alternatively the added signals Sa+Sb and Sc+Sd. The first and second switches 33A and 33B are linked with each other and operated with a control signal Is varying in response to a direction of movement of the spiral record track in relation to the center beam incident upon the optical record disc.

When the direction of movement of the spiral record track in relation to the center beam incident upon the optical record disc is of such that the diffraction pattern corresponding to each pit in the spiral record track moves in the direction indicated with the arrow F in the beam spot P formed on the photodetecting elements 8a to 8d by the reflected center beam, the added signal Sa+Sb is picked out by the first switch 33A and the added signal Sc +Sd is picked out by the second switch 33B, and to the contrary, when the direction of movement of the spiral record track in relation to the center beam incident upon the optical record disc is of such that the diffraction pattern corresponding to each pit in the spiral record track moves in the direction indicated with the arrow R in the beam spot P formed on the photodetecting elements 8a to 8d by the reflected center beam, the added signal Sc+Sd is picked out by the first switch 33A and the added signal Sa+Sb is picked out by the second switch 33B.

The added signal Sa+Sb or Sc+Sd thus picked up by the first switch 33A is supplied directly or through a phase shifter 34 to a switch 35. The phase shifter 34 is operative to cause the added signal Sa+Sb or Sc+Sd to have a phase lag corresponding to the phase difference between the output signals Sa and Sd derived respectively from the photodetecting elements 8a and 8d, or between the output signals Sb and Sc derived respectively from the photodetecting elements 8b and 8c, so that there is no phase difference between the added signal Sa+Sb or Sc+Sd subjected to the phase lag by the phase shifter 34 and the added signal Sc+Sd or Sa+Sb picked up by the second switch 33B.

The switch 35 is operated with a control signal So to extract selectively the added signal Sa+Sb or Sc+Sd picked up by the first switch 33A and the added signal Sa+Sb or Sc+Sd subjected to the phase lag by the phase shifter 34. The control signal So causes the switch 35 to extract the added signal Sa+Sb or Sc+Sd when the phase differences between the output signals Sa and Sd derived respectively from the photodetecting elements 8a and 8d and between the output signals Sb and Sc derived respectively from the photodetecting elements 8b and 8c are substantially negligible, for example, in the case where the optical record disc is of the constant angular velocity (CAV) type and the center beam is incident upon an area close to the outermost radius of the optical record disc, and further causes the switch 35 to extract the added signal Sa+Sb or Sc+Sd subjected to the phase lag by the phase shifter 34 on other occasions.

In the case of the optical record disc of the CAV type, a speed of movement of the spiral record track in relation to the center beam incident upon the optical disc is relatively high at an area close to the innermost radius of the optical record disc so that each of the phase differences between the output signals Sa and Sd and between the output signals Sb and Sc is relatively large and cannot be neglected, but relatively low at an area close to the outermost radius of the optical record disc so that each of the phase differences between the output signals Sa and Sd and between the output signals Sb and Sc is negligibly small. Therefore, by way of example, the control signal St is set to cause the switch 35 to extract the added signal Sa+Sb or Sc+Sd picked out the first switch 33A when the center beam impinges upon an area including one hundred turns counted from the outermost turn of the spiral record track on the optical record disc.

The added signal Sa+Sb or Sc+Sd picked out by the first switch 33A or the added signal Sa+Sb or Sc+Sd subjected to the phase lag by the phase shifter 34 thus extracted by the switch 35 is added to the added signal Sc+Sd or Sa+Sb picked out by the second switch 33B in an adder 37 to produce a reproduced information signal Si'. In this connection, the switch 35 and the adder 37 constitute jointly a mixer for producing the reproduced information signal Si'.

With the arrangement described above, the reproduced information signal Si' is obtained from the adder 37 as a signal with reduced waveform distortion and an improved signal to noise ratio in both a situation wherein the optical record disc is rotated clockwise in relation to the laser light beams incident upon the optical record disc and another situation wherein the optical record disc is rotated counterclockwise in relation to the laser light beams incident upon the optical record disc.

Figure 8:
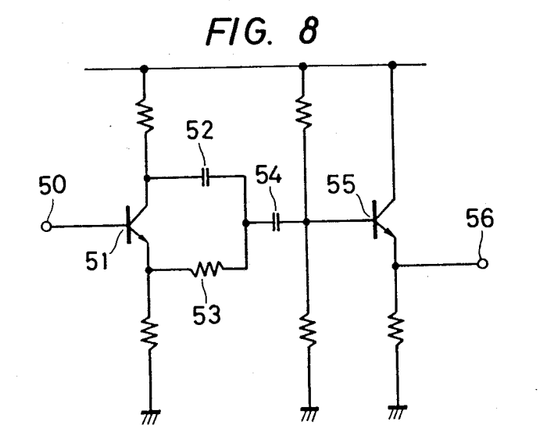
FIG. 8 is a schematic circuit diagram showing an example of a phase shifter used in the embodiment shown in FIG. 7.

FIG. 8 shows an example of a phase shift circuit which can be used as the phase shifter 34 of the embodiment shown in FIG. 7. In this example, a signal supplied to an input terminal 50 is subjected to a phase lag in accordance with its frequency by a phase shifting circuit portion comprising a transistor 51, a capacitor 52 connected to a collector of the transistor 51, and a resistor 53 connected to an emitter of the transistor 51, and derived through a capacitor 54 and a buffer transistor 55 of the emitter follower configuration to an output terminal 56.

Incidentally, in the embodiment shown in FIG. 7, an added signal Sa+Sc resulting from addition of the output signal Sa of the photodetecting element 8a to the output signal Sc of the photodetecting element 8c performed in an adder 40 and an added signal Sb+Sd resulting from addition of the output signal Sb of the photodetecting element 8b to the output signal Sd of the photodetecting element 8d performed in an adder 41 are supplied to a subtracter 42 to produce a focusing error signal Sf which corresponds to the difference between the added signals Sa+Sc and Sb+Sd. Further, an output signal Sl of the detecting portion 8L for detecting one of the reflected side beams and an output signal Sr of the detecting portion 8R for detecting the other of the reflected side beams are supplied to a subtracter 43 to produce a tracking error signal St which corresponding to the difference between the output signals Sl and Sr.

Figure 9:
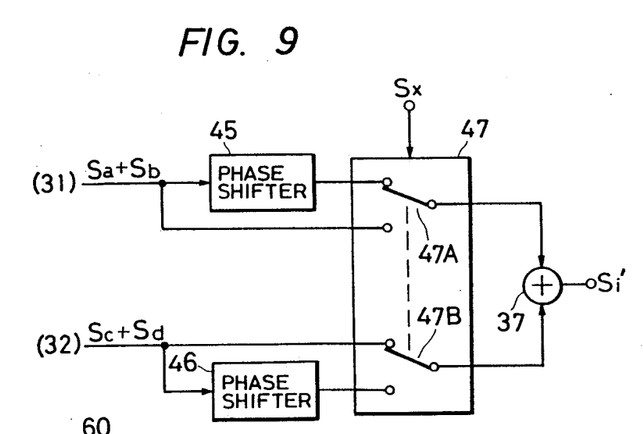
FIG. 9 is a schematic illustration showing a portion of another embodiment of a signal reproducing system for use in an optical disc player according to the present invention.

FIG. 9 shows a part of another embodiment of a signal reproducing system according to the present invention.

This embodiment is obtained by modifying the embodiment shown in FIG. 7 to employ two phase shifters 45 and 46 and a switching block 47 operating with a control signal Sx in place of the switching block 33, the phase shifter 34 and the switch 35 provided originally in the embodiment shown in FIG. 7. Each of the phase shifters 45 and 46 is equivalent to the phase shifter 34 and the switching block 47 contains first and second switches 47A and 47B.

In the embodiment shown in FIG. 9, the added signal Sa+Sb obtained from the adder 31 is supplied directly and through the phase shifter 45 to the first switch 47A in the switching block 47 and the added signal Sc+Sd obtained from the adder 32 is supplied directly and through the phase shifter 46 to the second switch 47B in the switching block 47. The first and second switches 47A and 47B in the switching block 47 are linked with each other and operated with the control signal Sx. The control signal Sx causes the first and second switches 47A and 47B to extract the added signals Sa+Sb and Sc+Sd, respectively, when the phase differences between the output signals Sa and Sd derived respectively from the photodetecting elements 8a and 8d and between the output signals Sb and Sc derived respectively from the photodetecting elements 8b and 8c are substantially negligible. In the case where the phase differences between the output signals Sa and Sd and between the output signals Sb and Sc cannot be substantially negligible, the control signal Sx causes the first and second switches 47A and 47B to extract the added signal Sa+Sb subjected to a phase lag by the phase shifter 45 and the added signal Sc+Sd obtained from the adder 32 without passing through the phase shifter 46, respectively, when the direction of movement of the spiral record track in relation to the center beam incident upon the optical record disc is of such that the diffraction pattern corresponding to each pit in the spiral record track moves in the direction indicated with the arrow F in FIG. 7 in the beam spot formed on the photodetecting elements 8a to 8d by the reflected center beam, and further causes the first and second switches 47A and 47B to extract the added signal Sa+Sb obtained from the adder 31 without passing through the phase shifter 45 and the added signal Sc+Sd subjected to a phase lag by the phase shifter 46, respectively, when the direction of movement of the spiral record track in relation to the center beam incident upon the optical record disc is of such that the diffraction pattern corresponding to each pit in the spiral record track moves in the direction indicated with the arrow R in FIG. 7 in the beam spot P formed on the photodetecting elements 8a to 8d by the reflected center beam.

The signals thus extracted by the first and second switches 47A and 47B in the switching block 47 are added to each other in an adder 37 to produce the reproduced information signal Si'. Therefore, the advantages which are the same as those obtained in the embodiment shown in FIG. 7 are obtained also in the embodiment shown partially in FIG. 9.

Figure 10:
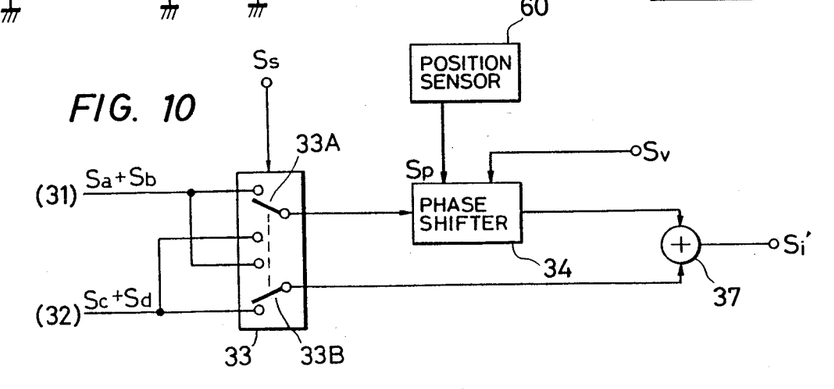
FIG. 10 is a schematic illustration showing a portion of a further embodiment of a signal reproducing system for use in an optical disc player according to the present invention.

FIG. 10 shows a part of a further embodiment of signal reproducing system according to the present invention.

This embodiment is obtained also by modifying the embodiment shown in FIG. 7 to use a position sensor 60 and a disc discrimination signal Sv in place of the switch 35 and the control signal Sx provided originally in the embodiment shown in FIG. 7. The position sensor is operative to detect a position on the optical record disc upon which the center beam impinges and to produce a detection output signal Sp corresponding to the detected position and the disc discrimination signal Sv indicates a type of the optical record disc, that is, the CAV type or the constant linear velocity (CLV) type.

In the embodiment shown in FIG. 10, the phase shifter 34 is controlled by the detection output signal Sp and the disc discrimination signal Sv so as to prevent the added signal Sa+Sb or Sc+Sd picked out by the first switch 33A in the switching block 33 from having a phase lag when the disc discrimination signal Sv indicates the CLV type and the detection output signal Sp represents a position in an area close to the outermost radius of the optical record disc and, on other occasions, to cause the added signal Sa+Sb or Sc+Sd picked out by the first switch 33A in the switching block 33 to having a phase lag corresponding to the phase difference between the output signals Sa and Sd derived respectively from the photodetecting elements 8a and 8d or between the output signals Sb and Sc derived respectively from the photodetecting elements 8b and 8c.

Then, the added signal Sa+Sb or Sc+Sd derived from the phase shifter 34 is added to the added signal Sc+Sd or Sa+Sb picked out by the second switch 33B in the switching block 33 in the adder 37 to produce the reproduced information signal Si'. Accordingly, the advantages which are the same as those obtained in the embodiment shown in FIG. 7 are obtained also in the embodiment shown partially in FIG. 10.

Each of the embodiments shown in FIGS. 7, 9 and 10, respectively, and described above may be preferably applied to the optical disc player used for reproducing information signals from the double-faced optical record disc, as shown partially in FIG. 4 or the compatible optical disc player which is constituted to be able to reproduce selectively both information signals from two different types of optical record discs, as shown partially in FIG. 6.

In the case where one of the embodiments is applied to such an optical disc player as shown in FIG. 4, on which the double-faced optical record disc is loaded so that reproductions of information signals recorded respectively on both sides of first and second surfaces of the double-faced optical record disc opposite to each other are carried out selectively, the direction of rotation of the double-faced optical record disc is reversed between the reproduction of the information signal recorded on the side of the first surface and the reproduction of the information signal recorded on the side of the second surface, and the switching block 33 in the embodiment shown in FIG. 7 or FIG. 10 or the switching block 47 in the embodiment shown in FIG. 8 is controlled by the control signal Is or Sx so that the added signal Sa+Sb subjected to the phase lag by the phase shifter 34 or 45 and the added signal Sc+Sd obtained from the adder 32 without passing through the phase shifter 34 or 46 are to be supplied to the adder 37 during the reproduction of the information signal recorded on the side of the first surface of the double-faced optical record disc and the added signal Sa+Sb obtained from the adder 31 without passing through the phase shifter 34 or 45 and the added signal Sc+Sd subjected to the phase lag by the phase shifter 34 or 46 are to be supplied to the adder 37 during the reproduction of the information signal recorded on the side of the second surface of the double-faced optical record disc.

Further, in the case where one of the embodiments is applied to such a compatible optical disc player as shown in FIG. 6, on which first and second optical record discs of different types are loaded substantially in a common plane so that reproductions of information signals recorded respectively on the first and second optical record discs are carried out selectively, the first and second optical record discs are rotated in the same direction, and the switching block 33 in the embodiment shown in FIG. 7 or FIG. 10 or the switching block 47 in he embodiment shown in FIG. 8 is controlled by the control signal Is or Sx so that the added signal Sa+Sb subjected to the phase lag by the phase shifter 34 or 45 and the added signal Sc+Sd obtained from the adder 32 without passing through the phase shifter 34 or 46 are to be supplied to the adder 37 during the reproduction of the information signal recorded on the first optical disc and the added signal Sa+Sb obtained from the adder 31 without passing through the phase shifter 34 or 45 and the added signal Sc+Sd subjected to the phase lag by the phase shifter 34 or 46 are to be supplied to the adder 37 during the reproduction of the information signal recorded on the second optical record disc.

What is claimed is:

1. A signal reproducing system for use in an optical disc player using a light beam incident upon an optical record disc on which an information signal is recorded in a record track to read the information signal from the optical record disc, comprising:

disc driving means for rotating the optical record disc including the record track in a predetermined direction, optical head means including an optical system for causing the light beam to impinge upon the optical record disc rotated by said disc driving means and receiving a reflected light beam from the optical record disc and at least first and second photodetecting elements so that a light beam spot is formed on the first and second photodetecting elements by the reflected light beam received by the optical system and the photodetecting elements are aligned along a direction of movement of a diffraction pattern appearing in the beam spot in accordance with the movement of the record track, phase shifting means for varying a phase of at least one of first and second output signals respectively based on detection outputs of said first and second photodetecting element, switching means for causing the first and second outputs signals selectively to pass through said phase shifting means in response to the direction of movement of the record track relative to the light beam incident upon the optical record disc, and mixing mean operative to add one of the said first and second output signals derived from said phase shift means to the other of said first and second output signals so as to produced a reproduced information signal.

2. A signal reproducing system according to claim 1, wherein said phase shifting means is operative to cause one of said first and second output signals to have a phase lag corresponding to a phase difference between said detection outputs of the first and second photodetecting elements.

3. A signal reproducing system according to claim 1, wherein said mixing means includes phase-shift restricting means for selectively rendering said phase shifting means substantially ineffective.

4. A signal reproducing system according to claim 3, wherein said phase-shift restricting means comprises second switching means for selecting one of said first and second output signals directly and an output of said phase shifting means by its switching operation.

5. A signal reproducing system according to claim 4, wherein said second switching means performs its switching operation in accordance with a position on the optical record disc at which the light beam impinges when the optical record disc is of the constant angular velocity type.

6. A signal reproducing system according to claim 3, wherein said phase-shift restricting means comprises control means for varying the amount of phase shift provided on one of said first and second output signals by said phase shifting means to be substantially zero at minimum.

7. A signal reproducing system according to claim 6, wherein said control means varies the amount of said phase shift provided on one of said first and second output signals in accordance with a position on the optical record disc at which the light beam impinges when the optical record disc is of the constant angular velocity type.

8. A signal reproducing system according to claim 1, wherein said optical record disc is a double-faced disc having record tracks formed respectively on first and second surfaces thereof, said optical head means being movable around the double-faced disc to face said first and second surfaces selectively for reproducing the information signals from the record tracks formed respectively on the sides of said first and second surfaces, in which a direction of rotation of the double-faced disc is reversed for reproducing the information signal from the record track formed on the first surface and for reproducing the information signal from the record track formed on the second surface, and wherein said switching means is controlled so as to cause only said first output signal to pass through said phase shifting means during reproduction of the information signal from the record track formed on the first surface and cause only said second output signal to pass through said phase shifting means during the reproduction of the information signal from the record track formed on the side of said second surface.

9. A signal reproducing system according to claim 1, wherein said optical disc player selectively reproduces respective information signals from first and second optical record discs of different types which are loaded substantially in a common place on said optical disc player and rotated in the same direction, in which said optical head means moves along radial directions of each of said first and second optical record discs to cause the light beam to trace record tracks formed respectively on said first and second optical record discs for reproducing the information signals from the record tracks formed respectively on said first and second optical record discs, and wherein said switching means selectively causes said first output signal to pass through said phase shifting means during reproduction of the information signal on said first optical record disc and selectively causes said second output signal to pass through said phase shifting means during reproduction of the information signal on said second optical record disc.

10. A signal reproducing system for use in an optical disc player using a light beam incident upon an optical record disc on which an information signal is recorded in a record track to read the information signal from the optical record disc, comprising:

photodetecting means including at least first and second photodetecting elements disposed so that a light beam spot is formed on the first and second photodetecting elements caused by the light beam reflected from the optical record disc and said first and second photodetecting elements are aligned along a direction of movement of a diffraction pattern formed in the light beam spot in response to the record track on the optical record disc, phase shifting means for varying a phase of at least one of first and second output signals respectively based on detection outputs of said first and second photodetecting elements, switching means for causing said first and second output signals selectively to pass through said phase shifter in response to a detected direction of rotation of the record track relative to the light beam incident upon the optical record disc, and mixing means operative to add one of said first and second output signals derived from said phase shifter to the other of said first and second output signals so as to produce a reproduced information signal.

11. A signal reproducing system according to claim 1, wherein said phase shifting means is operative to cause one of said first and second output signals to have a phase lag corresponding to a phase difference between said detection outputs of the first and second photodetecting elements.

12. A signal recording system according to claim 11, wherein mixing means operative further to add up said first and second output signals both obtained without passing through said phase shifting means as occasion demand.

* * * * *

UNITED STATES PATENT AND TRADEMARK OFFICE
CERTIFICATE OF CORRECTION

PATENT NO. : 4,896,309

DATED : January 23, 1990

INVENTOR(S) : Akio Yamakawa, et al.

It is certified that error appears in the above-identified patent and that said Letters Patent is hereby corrected as shown below:

Col. 5, line 23, "disc" should not be indented.

Col. 8, line 38, change "Is" to --Ss-- line 68, change "8d," to --8d,--

Col. 12, line 10, change "Is" to --Ss-- line 34, change "he" to --the-- line 35, change "Is" to --Ss--

IN THE CLAIMS:

Col. 12, line 61, after "elements" insert --disposed--

Col. 14, line 60, change "recording" to --reproducing--

Signed and Sealed this

Second Day of April, 1991

Attest:

HARRY F. MANBECK, JR.

Attesting Officer

Commissioner of Patents and Trademarks